(No Model.)

S. J. MEEKER & C. H. TAYLOR.
CAR COUPLING.

No. 563,047. Patented June 30, 1896.

Attest:
Fred. W. Dane
A. L. Hayes

Inventors:
Stephen J. Meeker
Chas. H. Taylor
by Chas. F. Dane
their atty.

UNITED STATES PATENT OFFICE.

STEPHEN J. MEEKER, OF NEWARK, AND CHARLES H. TAYLOR, OF SOUTH ORANGE, NEW JERSEY.

CAR-COUPLING.

SPECIFICATION forming part of Letters Patent No. 563,047, dated June 30, 1896.

Application filed February 13, 1893. Serial No. 462,059. (No model.)

*To all whom it may concern:*

Be it known that we, STEPHEN J. MEEKER, a resident of Newark, and CHARLES H. TAYLOR, a resident of South Orange, Essex county, and State of New Jersey, citizens of the United States, have invented new and useful Improvements in Car-Couplers, of which the following description, taken in connection with the drawings herewith accompanying, is a specification.

Our invention relates more particularly to that class of car-couplers provided with a vertically-operating locking pin or bolt as the device for locking the coupling hook or knuckle in a closed position, and has for its object to provide a cheap, simple, and positively-operating device or means for checking or limiting the upward movement of the locking pin or bolt, when being raised to release the coupling hook or knuckle, to prevent its being withdrawn from the opening in the draw-head in which it operates. This object we secure by means of the construction and arrangement of parts as will hereinafter be described in detail, and pointed out in the claims.

Figure 1:
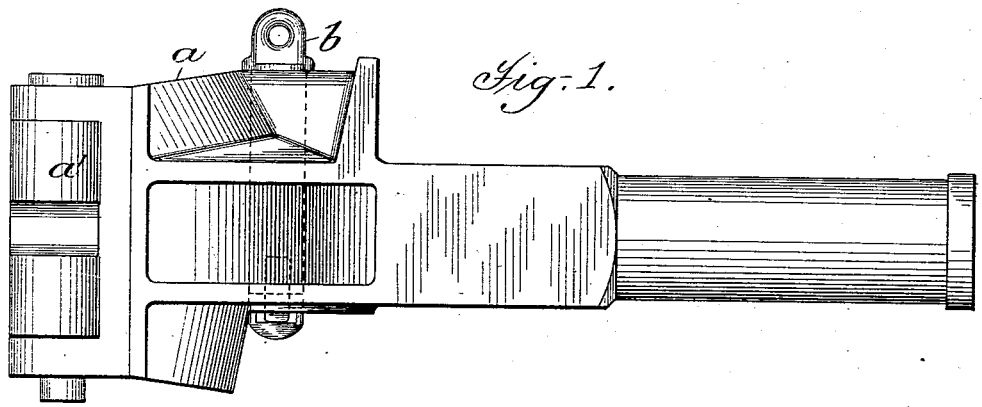
Figure 2:
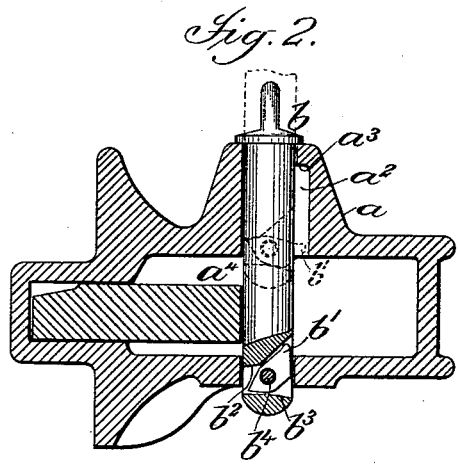
Figure 3:
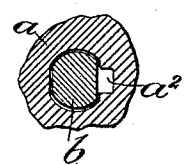

Referring to the drawings, Figure 1 represents a side view of a coupler embodying our invention; Fig. 2, a vertical section of the draw-head through line 2 2 of Fig. 1, with the locking-pin partly in section, showing the construction of the device forming our invention; Fig. 3, a view of the locking pin or bolt in cross-section and the opening in the draw-head in which it operates.

To explain in detail, $a$ represents the draw-head of the coupler, $a'$ the coupling hook or knuckle, and $b$ the vertically-operating locking pin or bolt, which is adapted to engage with an inner arm $a^4$ of said hook or knuckle to adjustably lock the latter in a closed position in a manner as well understood by those skilled in the art.

In the present instance and according to our invention, we have provided the pin or bolt $b$ with a pawl $b'$, which is pivoted or supported within an opening therein adjacent to its lower end, as more clearly shown in Fig. 2, and have also provided a vertically-arranged groove or depression $a^2$ in the wall of the upper portion of the opening in which the pin or bolt $b$ operates, into which the end of the said pawl $b'$ is adapted to extend when raised in line therewith, as shown by dotted lines in Fig. 2, and engage with its end wall $a^3$ to limit the upward movement of the pin or bolt, when the latter is raised to release the hook or knuckle, and prevent its withdrawal from the opening in the draw-head.

The opening in the pin or bolt $b$ in which the pawl $b'$ is supported is of such form as to allow the end of the pawl to be turned or moved within the line of the outer edge or surface of the pin or bolt, when in a lowered position, as shown in Fig. 2, in order to allow for the ready insertion or removal of the pin or bolt to and from its position in the opening in the draw-head, and also to allow for its proper operation in case a link or similar coupling device, which would embrace both sides of the pin, should be coupled therewith. The wall of this said opening in the pin or bolt $b$ is also formed with two oppositely-located bearing-surfaces $b^2$ and $b^3$, arranged at opposite sides of a central vertical line, which are adapted to be engaged by opposite sides of the pawl $b'$ when the end of the latter is in its normal outwardly-projecting position, as shown in Fig. 2.

It will thus be obvious that when the end of the pawl is moved into contact with the stop-wall $a^3$ the pressure on the pawl is received by the bearing-surfaces $b$ and $b$ and all strain upon the pivot-pin $b^4$ is removed, the advantage of which construction, by reason of the increased pressure that may be exerted upon the pawl without liability of causing damage thereto, will be obvious.

The pawl $b'$ necessarily projects that side of the locking pin or bolt opposite the side which engages with the arm of the coupling hook or knuckle, as more clearly shown in Fig. 2, in order that it may not interfere or engage with the latter and be prevented from being properly operated; and in order to prevent any liability of the pin or bolt $b$ from being inserted into its opening in the draw-head in such a reversed position, by inexperience, accident, or otherwise, we have formed the pin or bolt of unequal width in cross-section, as shown in Fig. 3, and have formed its receiving-opening in the draw-head of a corresponding form in such manner that the pin cannot be inserted into said receiving-opening in other than its proper position, as will be readily understood.

Having thus set forth our invention, what we claim as new, and desire to secure by Letters Patent of the United States, is—

1. A coupling-pin provided with a transversely-arranged slot or opening having bearing-surfaces at opposite sides thereof, and a pawl loosely pivoted within said slot or opening, constructed for engaging said oppositely-located bearing-surfaces when in an extended working position, whereby the strain is removed from its pivot-pin, substantially as described and for the purpose set forth.

2. The combination in a car-coupler with the horizontally-rotating coupling-hook, of a vertically-operating locking-pin supported within an opening in the draw-head and adapted to engage upon one side thereof with said hook and provided on its opposite side with a projecting pivoted stop device for engaging with a stop projection in the draw-head, the said locking-pin being wider upon one side thereof than the other, and its receiving-opening in the draw-head being of a like form, substantially as described and for the purpose set forth.

3. In a car-coupler, the combination with the draw-head provided with an opening therein, and the coupling device, of a vertically-operating locking pin or bolt supported in said opening and provided with a pivoted pawl supported thereby in a manner to be movable to and from a position within the line of its outer surface, the wall of said opening in the draw-head being constructed to close said pawl when below the path of the coupling device, and to release and engage with the same when raised above said path, substantially as described and for the purpose set forth.

4. In a car-coupler, the combination with the draw-head provided with an opening therein, and the coupling device, of a vertically-operating locking pin or bolt supported in said opening and provided with a pivoted pawl supported thereby in a manner to be movable to and from a position within the line of its outer surface, the wall of said opening in the draw-head being constructed to receive said pin in one position only and also to close said pawl when below the path of the coupling device, and to release and engage with the same when raised above said path, substantially as described and for the purpose set forth.

STEPHEN J. MEEKER.
CHAS. H. TAYLOR.

Witnesses:
CHAS. F. DANE,
A. L. HAYES.